United States Patent
Shioya et al.

(10) Patent No.: US 7,476,373 B2
(45) Date of Patent: Jan. 13, 2009

(54) TREATING AGENT FOR EXHAUST GAS CONTAINING METAL HYDRIDE COMPOUND AND METHOD FOR TREATING EXHAUST GAS CONTAINING METAL HYDRIDE COMPOUND

(75) Inventors: Yasushi Shioya, Toyama (JP); Masanori Yatsuda, Toyama (JP); Minoru Takachi, Toyama (JP); Hiroshi Wada, Tokyo (JP)

(73) Assignee: Sued-Chemie Catalysts Japan, Inc., Tokyo (JP)

(*) Notice: Subject to any disclaimer, the term of this patent is extended or adjusted under 35 U.S.C. 154(b) by 79 days.

(21) Appl. No.: 10/510,283

(22) PCT Filed: Apr. 8, 2002

(86) PCT No.: PCT/JP02/03500

§ 371 (c)(1),
(2), (4) Date: Oct. 6, 2004

(87) PCT Pub. No.: WO03/084659

PCT Pub. Date: Oct. 16, 2003

(65) Prior Publication Data

US 2005/0175520 A1 Aug. 11, 2005

(51) Int. Cl.
*B01D 53/00* (2006.01)
*C01B 21/00* (2006.01)
*C01G 28/00* (2006.01)
*B01J 23/00* (2006.01)
*B01J 21/00* (2006.01)

(52) U.S. Cl. .................. 423/213.5; 502/330; 502/339; 502/439

(58) Field of Classification Search ......... 502/313–319, 502/324, 326, 329–331, 337–339, 343, 347, 502/439, 174; 423/210, 213.5
See application file for complete search history.

(56) References Cited

U.S. PATENT DOCUMENTS

| | | | | |
|---|---|---|---|---|
| 2,179,454 A * | 11/1939 | Paulus | ................. | 15/250.4 |
| 2,927,141 A * | 3/1960 | Haley, Jr. et al. | ............ | 585/262 |
| 3,513,109 A * | 5/1970 | Stiles | ......................... | 502/241 |
| 3,579,569 A * | 5/1971 | Montgomery et al. | ....... | 560/245 |
| 3,758,418 A * | 9/1973 | Leonard et al. | ............ | 502/348 |
| 3,844,981 A * | 10/1974 | Cusumano | ................. | 502/345 |
| 3,873,614 A * | 3/1975 | Lamberti et al. | ........... | 562/537 |
| 3,900,342 A * | 8/1975 | Hohne et al. | ................ | 502/330 |
| 3,979,332 A * | 9/1976 | Kiovsky et al. | ................ | 502/3 |
| 4,049,584 A * | 9/1977 | Weissel | ...................... | 502/313 |
| 5,378,673 A * | 1/1995 | Reynolds et al. | ............ | 502/174 |
| 5,462,693 A | 10/1995 | Ichimura et al. | | |
| 5,488,024 A * | 1/1996 | Cheung et al. | ........... | 178/18.07 |
| 5,665,321 A * | 9/1997 | Campbell et al. | ........... | 423/210 |
| 5,686,380 A * | 11/1997 | Pitchai et al. | ............... | 502/347 |
| 5,849,662 A * | 12/1998 | Praserthdam | ............... | 502/330 |
| 5,853,678 A * | 12/1998 | Sugimori et al. | ............ | 423/210 |
| 5,953,911 A * | 9/1999 | Guth et al. | .................... | 60/295 |
| 6,083,870 A * | 7/2000 | Kahn et al. | ................ | 502/340 |
| 6,392,066 B1 * | 5/2002 | Mul et al. | ................... | 549/534 |
| 6,417,136 B2 * | 7/2002 | Cheung et al. | ............. | 502/330 |
| 6,797,669 B2 * | 9/2004 | Zhang et al. | ................ | 502/339 |
| 2002/0010094 A1 * | 1/2002 | Lockemeyer | ............... | 502/439 |
| 2002/0081243 A1 * | 6/2002 | He | ............................. | 422/177 |

FOREIGN PATENT DOCUMENTS

| | | |
|---|---|---|
| JP | 63-200820 | 8/1988 |
| JP | 05-161841 | 6/1993 |
| JP | 08-192024 | 7/1996 |
| JP | 8-192024 | 7/1996 |

* cited by examiner

*Primary Examiner*—Cam N. Nguyen
(74) *Attorney, Agent, or Firm*—Young & Thompson

(57) ABSTRACT

The present invention provides a treating agent for a metal hydride-containing exhaust gas, wherein the treating agent is low in exothermic property and further high in performance in a treatment of harm-elimination for the metal hydride-containing exhaust gas, comprises at least one among metal hydroxide, metal carbonate, basic metal carbonate, and further supports at least one metal among group-VIII noble metals on periodic table and silver. Therefore, the performance of harm-elimination for the metal hydride-containing exhaust gas is prominently improved. The treating agent in the present invention is high in performance and further low in exothermic property, thereby that is useful in the treatment for the metal hydride-containing exhaust gas generated in semiconductor manufacturing industry and the like.

9 Claims, No Drawings

TREATING AGENT FOR EXHAUST GAS CONTAINING METAL HYDRIDE COMPOUND AND METHOD FOR TREATING EXHAUST GAS CONTAINING METAL HYDRIDE COMPOUND

TECHNICAL FIELD

The present invention relates to a treating agent for metal hydride-containing exhaust gas and a method of treating the metal hydride-containing exhaust gas and more specifically relates to a treating agent for the metal hydride-containing exhaust gas generated during the manufacturing process of semiconductor, wherein at least one metal selected from group-VIII noble metals on the periodic table and silver is supported on metal hydroxide, metal carbonate, basic metal carbonate, or a mixture of these compounds, and a method of treating the exhaust gas, wherein the metal hydride-containing exhaust gas is exposed to the treating agent.

BACKGROUND OF THE ART

In a manufacturing plant of semiconductor, variety of metal hydride gases and halide gases are used during the manufacturing process. Since these gases are combustible and/or harmful, it is not allowed for environmental conservation to emit exhaust gas containing these gases to the atmosphere, therefore treatment for eliminating risky and hazardous properties thereof is needed.

As to the treatment for the exhaust gas, there are a wet type processing and a dry type processing. The former is a method of cleaning the exhaust gas with chemicals. While the latter is a method of circulating the exhaust gas into a filled column of a granular solid treating agent and thereby separating risky and hazardous gases and eliminating the harmful properties due to chemical functioning of gases targeted for harm elimination and the treating agent, for instance, adsorption and/or chemical reaction, and the method has often been used for treatment of metal hydride-containing exhaust gases or halide gas-containing exhaust gases.

A large number of patents are directed to the treating agents for metal hydride-containing exhaust gases. For examples, treating agents comprising metal hydroxide, metal carbonate, or basic metal carbonate are disclosed in Japanese laid-open patent publication No. 05-284847, Japanese laid-open patent publication No. 06-319945, Japanese laid-open patent publication No. 08-192024, Japanese patent publication No. 05-61966, registered Japanese patent publication No. 2604991 and the like.

These treating agents however have superior harm-eliminating capacities even if metal hydroxide, metal carbonate, or basic metal carbonate is independently used as a treating agent, but as rate of reaction is slow, in the case that a concentration level of harmful components in the exhaust gases is high or in the case that a flow rate thereof is high, a rate of harm-elimination is not enough, thereby the concentration level of harmful components therein after treatment is sometimes high. The above-described treating agents do not show sufficient performance of harm-elimination to some kinds of metal hydride gases with poor reactivity such as germane.

On the other hand, each of the chemical reactions following the above-mentioned treatment of the exhaust gases is an exothermic reaction. Accordingly, the treatment of the exhaust gases with metal compounds inevitably causes a rise in temperature, particularly when performing a treatment of the exhaust gases containing a high level of metal hydride or a treatment of a large amount of the exhaust gases, a remarkable temperature rise is likely to be caused. For which reason, the treating agent is required not only to be high-performance but also to have low exothermic property.

DISCLOSURE OF THE INVENTION

An object of the present invention is to provide a treating agent which shows high treatment capacity and also low exothermic property in a harm-elimination treatment of the metal hydride-containing exhaust gas produced during the manufacturing process of semiconductor.

A reduction of metal compounds with hydrogen is an exothermic reaction, and a calorific value thereof is different depending on the kinds of compounds. For instance, copper oxide and copper hydroxide are shown as an example as follows. Copper hydroxide as a hydroxide is lower in calorific value than copper oxide as an oxide.

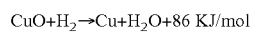

$CuO+H_2 \rightarrow Cu+H_2O+86$ KJ/mol

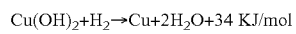

$Cu(OH)_2+H_2 \rightarrow Cu+2H_2O+34$ KJ/mol

The treatment of the metal hydride-containing exhaust gas with the metal compounds is considered to start from an adsorption and/or a chemical reaction just after the initiation of the treatment, to shift to the chemical reaction which becomes dominant from a time of an increase in temperature of the treating agent after time passes, and thereafter to continue a steady harm-elimination process consisting mainly of the chemical reaction until a majority of the metal components are consumed. On the contrary, the reaction in this steady state may also be inferred to be a reduction of the metal compounds with the metal hydride, the reduction with hydroxide is less exothermic than that with oxide as with a reduction of metal compounds with hydrogen, and also the same is true in basic carbonate. Namely, since it is more likely to cause the reduction of the metal component with hydrogen in a treatment of a reducing exhaust gas, it is inferred to preferably make low exothermic metal hydroxide, metal carbonate, basic metal carbonate, or mixtures thereof to be active metal components.

As the above-described, the treatment of the metal hydride-containing exhaust gas with the treating agent comprising metal hydroxide, metal carbonate, or basic metal carbonate is resulted from the adsorption and/or chemical reaction of the treating agent and the gas targeted for the harm-elimination, therefore, in order to improve capacity of the treating agent for treating the metal hydride gas, it is effective to ameliorate the above-described adsorptivity, an adsorption capacity, a reactivity and the like.

Inventors of the present invention have made a diligent investigation for solving the above-described problems and have found out the facts that a treating agent has an excellent harm-elimination rate for a high concentration of the metal hydride-containing exhaust gas and also shows a low exothermic property than the conventional metal oxide-based treating agent, wherein the treating agent supports at least one metal among group-VIII noble metals on the periodic table and silver on metal hydroxide, metal carbonate, basic metal carbonate, or a mixture of these compounds. A further detailed investigation was made based on this point of view, resulting in completing the present invention.

The present invention relates to a treating agent, wherein at least one metal among group-VIII noble metals on the periodic table and silver is supported on metal hydroxide, metal carbonate, basic metal carbonate, or a mixture of these compounds. The main metal compounds included in the treating agent are metal hydroxide, metal carbonate, basic metal carbonate, and a mixture thereof, and any metal existing stably may be used, particularly easily available and inexpensive metals such as copper, iron, cobalt, nickel, manganese, zinc, and chromium are advantageously used.

As the metal compounds, commercially available metal hydroxide, metal carbonate, or basic metal carbonate may be used. The metal compounds may also be produced by preparation of an aqueous solution of metal salts and subsequent neutralization with another aqueous solution of alkali compounds. It is preferable to use sodium hydroxide, potassium hydroxide, carbonate, or an aqueous ammonia as alkali compounds. A precipitate obtained through the neutralization is cleaned with water before filtration and dry process, thereby to be used as a raw material to be added with at least one metal component among group-VIII noble metals on the periodic table and silver, in some cases, a filtrate in itself may be used as the raw material.

Both the metal compounds commercially available and the metal compounds produced through a precipitation method may be used not only in a single compound but also as mixture thereof. In the case of the compounds through the precipitation method, the compounds may be precipitated separately and then mixed with each other to be used as a mixture, however it is preferable to obtain a precipitate containing a plurality of components through a co-precipitation method.

As to this treating agent, at least one metal component among group-VIII noble metals on the periodic table and silver is added to the metal compounds as a further additive component, wherein palladium, platinum, rhodium, or ruthenium may be used as the group-VIII noble metals. These components may be added not only separately but also in combination of a plurality of components. When supporting these components on the metal compounds, in the case of commercially available metal compound, it is preferable to be a powdered metal compound, a molding thereof or a granulated powder obtained by molding and subsequent crushing, and in the case of the metal compound obtained through the precipitation method, then it is preferable to be a powdered metal compound, a molding thereof or a metal compound crushed after molding. If the metal compounds obtained through the precipitation method is used, then additive component salts have in advance been dissolved to an aqueous solution of metal salts as a precursor of the metal compounds, thereafter addition may be made. These are shown as a list on the following Table 1.

[Table 1] Conditions for adding to the metal compounds at least one metal component among the group-VIII noble metals on the periodic table and silver.

| Method of adding noble metals or silver | Metal compounds | Remarks |
| --- | --- | --- |
| Kneading method | Commercially available products | Powder is kneaded with additive component compounds, followed by molding. |
| | Manufacturing through the precipitation method | Dry powder or filtrate is kneaded with additive component compounds, followed by molding. |
| Impregnation or dipping method | Commercially available products Manufacturing by the precipitation method | Molded or further crushed metal compound is impregnated into an aqueous solution of additive component salts. |
| Spraying method | Commercially available products | An aqueous solution of additive component salts is sprayed onto molded or further crushed metal compound. |
| | Manufacturing by the precipitation method | |
| Co-precipitation with metal compounds | | Additive component salts have previously been dissolved into an aqueous solution of precursor, followed by subsequent precipitation of metal compounds. |

The content of the above-described additive component is preferably ranged from 0.002% by weight to 3.0% by weight as a metal amount to a total weight of the treating agent. If the content is 0.002% by weight or less, then the increase in a treating rate of the metal hydride is not sufficient and if the content is 3% by weight or more, then not only no further improvement of the treating performance is recognized but also the expensive additive component is economically undesirable.

The following supplemental descriptions will be made about the method of adding the above-described additive component to the metal compounds. At first, in the case that an additive component is added through a kneading method, powdery metal compounds and additive component compounds are kneaded before molded by extrusion or tablet compression. In order for the treating agent to secure a mechanical strength to stand the use thereof, optionally, silica, alumina, magnesium, or an inorganic binders effective for other strength improvements may be added. A method of treating an exhaust gas is that a targeted gas to be treated is circulated into the treating agent packed in a filled column, whereby a molding treatment is required for reducing a pressure loss, if needed, these moldings are crushed to allow to be used as granule.

On the other hand, in the case that at least one metal among the group-VIII noble metals on the periodic table and silver is added through a impregnation method, a dipping method or a spraying method, metal compounds are previously molded by extrusion or tablet compression, if needed, crushed and granulated, followed by addition of additive components. If these components are added through the co-precipitation with the metal compounds, the additive component salts are dissolved to an aqueous solution of metal compound salts, followed by co-precipitation by neutralization with alkali, and then a series of processes from a precipitation generation to filtration is terminated before molded by extrusion or tablet compression, if needed, further crushed and granulated.

Further, the present invention relates to a method of treating the metal hydride-containing exhaust gas, wherein the exhaust gas is exposed to a treating agent for the metal hydride-containing exhaust gas, in which at least one metal among the group-VIII noble metals on the periodic table and silver is supported on metal hydroxide, metal carbonate, basic metal carbonate, or mixtures thereof.

The treating agent obtained by supporting at least one metal among the group-VIII noble metals on the periodic table and silver on metal hydroxide, metal carbonate, basic metal carbonate, or mixtures thereof, is packed into a circulation type filled column in practical use, subsequently is exposed to the metal hydride-containing exhaust gas, thereby to be used for the purpose of eliminating the metal hydride gas. The metal hydride gases which allow to be eliminated by the treating agent in the present invention are silane, arsine, phosphine, disilane, diborane, hydrogen selenide, germane, dichlorsilane and the like. The treating agent in the present invention is mainly composed of metal hydroxide, metal carbonate, or basic metal carbonate, which are discolored by the adsorption and/or the chemical reaction due to the exposure to the metal hydride gases, thereby having an advantage to assess a remaining treatment capacity by viewing and observing condition of change in color tone thereof.

Inventors in the present invention filled the treating agent obtained through a series of processes into a circulation type reaction device made of stainless, and circulated a reducing gas containing silane, phosphine, and germane as the metal hydride gases into a reactor, while measuring temperature of a layer of the treating agent, measured and monitored an amount of leakage of the metal hydride gases in outlet gases with a break monitor (produced by Japan Bionics Co. Ltd.), so as to conduct an examination of measuring a performance of harm-elimination at ambient temperatures.

As the result, in the case of an oxide based treating agent belonging to a category of a conventional technique, a temperature increase in a layer of the treating agent was remarkable after initiating the examination due to a runaway reaction, whereby continuation of the examination of measuring a performance thereof was difficult. On the other hand, in the case of the treating agent according to the present invention, a temperature increase in a layer filled with the treating agent was recognized, however it was not severely exothermic so that the examination was not interrupted. As to performance thereof, the treating agent according to the present invention is a superior in harm-eliminating capacity (L/kg) compared to a treating agent based on metal hydroxide, metal carbonate, or basic metal carbonate which do not contain at least one metal among the group-VIII noble metals on the periodic table and silver, and further it was confirmed that the metal hydroxide was not detected in the outlet gases over an extended time period, whereby the present invention was completed.

BEST MODES FOR PRACTICE OF THE INVENTION

Secondly, contents of the present invention are further described in detail using embodiments. An evaluation of performance of a treating agent according to the present invention was carried out by measuring a performance of harm-elimination of metal hydroxide gas contained in hydrogen gas. The measurement was carried out with an atmospheric circulation type reaction device. The measuring device, a measurement conditions, and a method of measuring are as follows:

(A measuring device of the performance of harm-elimination of metal hydride gas, and the measurement conditions)

| | |
|---|---|
| measuring device of the performance of harm-elimination: | an atmospheric circulation type reaction device |
| size of reaction tower: | 50 mm in inner diameter, 1200 mm in length |
| measurement conditions | 590 cc (300 mm in height of filling) |
| an amount of used treating agent: | |

-continued

| | |
|---|---|
| GHSV: | 320 hr$^{-1}$ |
| pressure: | normal pressure |
| reaction temperature: | ambient temperature |
| composition of reaction gas: | 1% of SiH$_4$ (silane), or Ph$_3$ (phosphine), or GeH$_4$ (germane), balance of H$_2$ |

(A method of measuring the performance of harm-elimination of metal hydride gas, and a calculation method of the performance of harm-elimination)

590 cc of the treating agent is filled into a reaction tower up to 300 mm in height of filling, and the reaction tower is set on the measuring device, and subsequently metal hydride gas diluted with hydrogen is circulated in a layer filled with the treating agent. After the gas starts to circulate, a leakage of the metal hydride gas into an outlet gases of the reaction tower is measured and monitored by the break monitor (produced by Japan Bionics Co. Ltd.) all the while measurement of a temperature of the layer filled with the treating agent is being carried out, whereby an integrated quantity of entering silane, phosphine, and germane is calculated until an outlet concentration reaches 5 ppm, and then is converted into an amount per 1 kg of the treating agent. Specifically, the performance of harm-elimination for the metal hydride gas is calculated from measurement results by using the following formula.

(Calculation method of the performance of harm-elimination of the metal hydride gas by the treating agent)

performance of harm-elimination $$(L/kg) = A \times (B/100) \times (C/E)$$

where A: measured gas flow rate (L/min.)
B: concentration of metal hydride gas (volume %)
C: accumulated time of gas circulation until an outlet concentration of metal hydride gas reaches a specific concentration (min.)
E: amount of filling of the treating agent Embodiment 1

As a metal compound, commercially available basic copper carbonate was used. The basic copper carbonate is added with an appropriate amount of purified water into a molding in a kneader, sufficiently mixed before molded by extrusion into a size of 3 mm in diameter and dried at a temperature of 120° C. An amount of water absorption of the molding thereof was measured, whereby palladium chloride was measured and dissolved into a purified water appropriate for the amount of water absorption so that a palladium content in the treating agent is 0.5% by weight. This solution was impregnated to the molding, and dried at a temperature of 120° C., thereby to obtain a treating agent. Palladium content and results of performance of harm-elimination for metal hydride in the obtained treating agent were shown in Table 2.

Embodiments 2-4

As to the Embodiment 1, treating agents for Embodiments 2-4 were prepared in the same process as the Embodiment 1, except that a consumed amount of palladium chloride was changed so that a palladium content in treating agents are 0.005% by weight, 0.02% by weight, and 1.0% by weight, respectively. Palladium content and results of performance of harm-elimination for metal hydride in the obtained treating agents were shown in Table 2.

Embodiments 5-7

As to the Embodiment 1, treating agents for Embodiments 5-7 were prepared in the same process as the Embodiment 1, except that silver, platinum, and ruthenium were supported instead of palladium as an additive component to use silver nitrate, chloroplatinic acid, and ruthenium chloride as their compounds. Silver content, platinum content, and ruthenium content and results of performance of harm-elimination for metal hydride in the obtained treating agents were shown in Table 2.

Embodiments 8-10

As to the Embodiment 1, treating agents for Embodiments 8-10 were prepared in the same process as the Embodiment 1, except that commercially available basic nickel carbonate, basic zinc carbonate, and copper hydroxide were respectively used instead of commercially available basic copper carbonate as metal compounds. Palladium content and results of performance of harm-elimination for metal hydride in the obtained treating agents were shown in Table 2.

Embodiment 11

An aqueous solution was prepared with copper nitrate, and a precipitate of basic copper carbonate was obtained by a neutralization with sodium carbonate prepared comparable to the aqueous solution, subsequently was cleaned with water to sufficiently eliminate impurities before filtered and dried, whereby to prepare basic copper carbonate as a metal compound. An dried filtrate was molded into a tablet of 3 mm in diameter and also 3 mm in height, and an amount of water absorption thereof was measured. Palladium nitrate was measured and dissolved into a purified water equivalent to 30% by weight of the amount of the water absorption so that palladium content in the treating agent is 0.5% by weight. This aqueous solution was sprayed onto a tablet in a fluid condition in a spraying device, and was dried at a temperature of 120° C., thereby obtaining a treating agent for Embodiment 11. Palladium content and results of performance of harm-elimination for metal hydride in the obtained treating agent were shown in Table 2.

Embodiment 12

As to the Embodiment 11, a precipitate of basic copper carbonate was proceeded to a filtrating step, and palladium nitrate solution prepared so as for content of palladium as a dried treating agent to be 0.5% by weight was added to the filtrated material, before sufficiently kneaded in a kneader. The obtained kneaded material was dried, and was put into a condition of the moisture appropriate for a wet type molding before molded by extrusion into a size of 3 mm in diameter, and then dried at a temperature of 120° C., thereby preparing a treating agent for Embodiment 12. Palladium content and results of performance of harm-elimination for metal hydride in the obtained treating agent were shown in Table 2.

Embodiment 13

As to the Embodiment 1, a treating agent for Embodiment 13 was prepared in the same process as Embodiment 1, except that a mixture of equal parts of basic nickel carbonate and basic copper carbonate was used instead of basic copper carbonate as a metal compound. Palladium content and results of performance of harm-elimination for metal hydride in the obtained treating agent were shown in Table 2.

Embodiment 14

Commercially available basic copper carbonate was molded by tablet compression into a tablet of 6 mm in diameter and also 6 mm in height, subsequently crushed and sized into a size of 2~4 mm. An amount of water absorption in this crushed material was measured, and palladium nitrate was measured and dissolved into a purified water comparable to the amount of the water absorption so that palladium content in a treating agent is 0.5% by weight, and impregnated into the crushed material, followed by drying process at a temperature of 120° C. to obtain the treating agent. Palladium content and results of performance of harm-elimination for metal hydride in the obtained treating agent were shown in Table 2.

Embodiment 15

An aqueous solution of a mixture of copper nitrate and palladium nitrate was prepared. Palladium nitrate was measured so that palladium content in a total weight of a treating agent is 0.5% by weight and used. Subsequently, a coprecipitate of palladium and basic copper carbonate was obtained by a neutralization with sodium carbonate prepared comparable to the palladium content. By cleaning the coprecipitate with water, impurities were sufficiently removed before filtrated, dried and molded by tablet compression into a tablet of 3 mm in diameter and also 3 mm in height, thereby preparing the treating agent for Embodiment 15. Palladium content and results of performance of harm-elimination for metal hydride in the obtained treating agent were shown in Table 2.

Embodiment 16

As to the Embodiment 1, an aqueous solution of a mixture of palladium chloride and ruthenium chloride was used instead of palladium chloride. An amount of palladium and an amount of ruthenium in the aqueous solution were equivalent, and a total weight of them was 0.5% by weight to a total weight of a treating agent. As to others, the treating agent for Embodiment 16 was prepared in the same process as Embodiment 1. Palladium content, ruthenium content and results of performance of harm-elimination for metal hydride in the obtained treating agent were shown in Table 2.

Comparative Example 1

As to the Embodiment 1, a preparation of a treating agent was stopped at a stage of extrusion molding of basic copper carbonate, without performing impregnation of a aqueous solution of palladium chloride, whereby preparing the treating agent excluding an additive component as Comparative Example 1. Results of performance of harm-elimination for metal hydride in the obtained treating agent were shown in Table 2.

Comparative Examples 2-4

As to the Comparative Example 1, treating agents for Comparative Examples 2-4 were prepared in the same process as the Comparative Example 1, except that basic nickel carbonate, basic zinc carbonate, and copper hydroxide were used instead of basic copper carbonate. Results of performance of harm-elimination for metal hydride in the obtained treating agents were shown in Table 2.

Comparative Example 5

As to the Example 1, palladium chloride as an additive component was impregnated before burned at a temperature of 350° C. instead of a drying process, thereby preparing a treating agent for Comparative Example 5 in which a metal compound was an oxide. Results of performance of harm-elimination for metal hydride in the obtained treating agent were shown in Table 2.

TABLE 2

Examination results of performance of treating agents for an metal hydride-containing exhaust gas.

| Types of treating agent | | Performance of harm-elimination (L/kg) | | | Exothermic condition (temperature rise: ° C.) |
|---|---|---|---|---|---|
| | | I | II | III | |
| Embodiment 1 | Pd (0.5% by weight)/basic copper carbonate | 45 | 90 | 15 | 30~40 |
| Embodiment 2 | Pd (0.005% by weight)/basic copper carbonate | 30 | 70 | 10 | 30~40 |
| Embodiment 3 | Pd (0.02% by weight)/basic copper carbonate | 35 | 75 | 12 | 30~40 |
| Embodiment 4 | Pd (1.0% by weight)/basic copper carbonate | 60 | 110 | 18 | 30~40 |
| Embodiment 5 | Ag (0.5% by weight)/basic copper carbonate | 50 | 90 | 14 | 30~40 |
| Embodiment 6 | Pt (0.5% by weight)/basic copper carbonate | 45 | 90 | 16 | 30~40 |
| Embodiment 7 | Ru (0.5% by weight)/basic copper carbonate | 43 | 94 | 16 | 30~40 |
| Embodiment 8 | Pd (0.5% by weight)/basic nickel carbonate | 47 | 91 | 15 | 30~40 |
| Embodiment 9 | Pd (0.5% by weight)/basic zinc carbonate | 40 | 80 | 14 | 30~40 |
| Embodiment 10 | Pd (0.5% by weight)/copper hydroxide | 50 | 100 | 13 | 30~40 |
| Embodiment 11 ① | Pd (0.5% by weight)/basic copper carbonate through the precipitation method | 58 | 110 | 19 | 30~40 |
| Embodiment 12 ② | Pd (0.5% by weight)/basic copper carbonate through the precipitation method | 52 | 103 | 16 | 30~40 |
| Embodiment 13 ③ | Pd (0.5% by weight)/a mixture of basic carbonate salts of equal parts of copper and nickel | 50 | 95 | 15 | 30~40 |
| Embodiment 14 ④ | Pd (0.5% by weight)/basic copper carbonate | 63 | 114 | 20 | 30~40 |
| Embodiment 15 | Pd (0.5% by weight)/basic copper carbonate (co-precipitated with Pd) | 55 | 100 | 13 | 30~40 |
| Embodiment 16 | Pd, Ru (0.25% by weight respectively)/basic copper carbonate | 45 | 92 | 17 | 30~40 |
| Comparative Example 1 | Basic copper carbonate | 25 | 50 | 0.4 | 30~40 |
| Comparative Example 2 | Basic nickel carbonate | 20 | 40 | 0.3 | 30~40 |
| Comparative Example 3 | Basic zinc carbonate | 10 | 20 | 0.2 | 30~40 |
| Comparative Example 4 | Copper hydroxide | 15 | 35 | 0.2 | 30~40 |
| Comparative Example 5 | Pd (0.5% by weight)/ copper oxide | Terminate to measure because of a runaway reaction | | | | where, I, II, and III in columns of performance of harm-elimination (L/kg) are respectively indicated as follows:
I: An integrated amount of eliminated $SiH_4$ gas until $SiH_4$ leaks 5 ppm in an outlet gas.
II: An integrated amount of eliminated $PH_3$ gas until $PH_3$ leaks 5 ppm in an outlet gas.
III: An integrated amount of eliminated $GeH_4$ gas until $GeH_4$ leaks 5 ppm in an outlet gas.
①~④ in columns of Embodiments are respectively indicated as follows:
①: Palladium is supported through a spraying method on a molding by tablet compression of basic copper carbonate prepared through a precipitation method.
②: Palladium is kneaded and supported on a filtrate of basic copper carbonate prepared through the precipitation method.
③: Palladium is impregnated and supported on a molding of a mixture of equal parts of basic copper carbonate and basic nickel carbonate.
④: Palladium is impregnated and supported on a crushed material of the molding by tablet compression of basic copper carbonate.
⑤: Basic copper carbonate and palladium are co-precipitated.

From the results in Table 2, Comparative Examples 1-4 have lower treating capacities compared to Embodiments, and especially a treating capacity of $GeH_4$ (Germane) is significantly low. A severe heat generation was observed during the examination, so that the examination was terminated halfway.

INDUSTRIAL APPLICABILITY

The treating agent for eliminating metal hydride in the present invention is high in treating capacity and also low in exothermic property, whereby it is useful in a treatment for an metal hydride-containing exhaust gas generated in semiconductor manufacturing industry and the like.

The invention claimed is:
1. A treating agent for a metal Hydride-containing exhaust gas, wherein said treating agent comprises:
a non-oxide metal based composition in which at least one metal selected from the group consisting of palladium, platinum, rhodium, and silver is supported on a metal carbonate, a basic metal carbonate, or a mixture thereof, wherein the weight of the at least one metal to the total weight of the treating agent is in a range of 0.002% by weight to 3.0% by weight.

2. The treating agent for the exhaust gas as claimed in claim 1, wherein metal components of the metal carbonate, the basic metal carbonate, or the mixture thereof comprise at least one of copper, iron, cobalt, nickel, manganese, zinc, and chromium.

3. The treating agent for the exhaust gas as claimed in claim 1, wherein said treating agent further comprises ruthenium.

4. A method of treating an exhaust gas, comprising:
removing metal hydride gas from a metal hydride-containing exhaust gas by exposing the metal hydridecontaining exhaust gas to a treating agent,
wherein the treating agent comprises a non-oxide metal based composition in which at least one metal selected from the group consisting of group-VIII noble metals of the periodic table and silver is supported on a metal hydroxide, a metal carbonate, a basic metal carbonate, or a mixture thereof, wherein the weight of the at least one of a group-VIII noble metal of the periodic table and silver to the total weight of the treating agent is in a range of 0.002% by weight to 3.0% by weight.

5. A treating agent for a metal Hydride-containing exhaust gas, comprising:
a metal compound selected from the group consisting of a metal hydroxide, a metal carbonate, a basic metal carbonate, and mixtures thereof; and
a group-VIII noble metal of the periodic table selected from the group consisting of palladium, platinum, rhodium and combinations thereof, supported on the metal compound to form a non-oxide metal based composition, wherein,
the group-VIII noble metal is present in an amount sufficient to increase the metal hydride treating rate of the metal compound.

6. The treating agent for exhaust gas as claimed in claim 5, wherein the amount of group-VIII noble metal sufficient to increase the metal hydride treating rate of the metal compound is 0.002% by weight to 3.0% by weight of the treating agent.

7. The treating agent for the exhaust gas as claimed in claim 5, further comprising ruthenium.

8. A method of treating an exhaust gas, comprising:
removing a metal hydride gas from a metal hydride-containing exhaust gas by exposing the exhaust gas to a treating agent, wherein,
said treating agent comprises a non-oxide metal based composition in which at least one metal selected from the group consisting of group-VIII noble metals of the periodic table and silver is supported on a metal hydroxide, a metal carbonate, a basic metal carbonate, or a mixture thereof.

9. The method of treating an exhaust gas as claimed in claim 8, wherein the weight of the at least one metal selected from the group consisting of a group-VIII noble metal of the periodic table and silver to the total weight of the treating agent is in a range of 0.002% by weight to 3.0% by weight.

* * * * *